(12) United States Patent
Zhang et al.

(10) Patent No.: US 8,594,140 B2
(45) Date of Patent: Nov. 26, 2013

(54) METHOD, DEVICE, AND SYSTEM FOR MULTIPLEXING AND MAPPING OPTICAL SIGNALS AND DEMULTIPLEXING AND DEMAPPING OPTICAL SIGNALS

(75) Inventors: Fatai Zhang, Shenzhen (CN); Huiying Xu, Shenzhen (CN); Xiaobing Zi, Shenzhen (CN); Yi Lin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 399 days.

(21) Appl. No.: 13/011,515

(22) Filed: Jan. 21, 2011

(65) Prior Publication Data

US 2011/0116793 A1  May 19, 2011

Related U.S. Application Data

(63) Continuation of application No. PCT/CN2009/071334, filed on Apr. 17, 2009.

(30) Foreign Application Priority Data

Jul. 21, 2008 (CN) .......................... 2008 1 0029598

(51) Int. Cl.
*H04J 3/02* (2006.01)
(52) U.S. Cl.
USPC .......................................................... 370/537
(58) Field of Classification Search
USPC ................. 370/464, 498, 532, 535, 537, 542; 398/43, 76, 77, 78, 98, 99
See application file for complete search history.

(56) References Cited

U.S. PATENT DOCUMENTS

| 6,646,983 | B1 | 11/2003 | Roy et al. |
| 7,315,693 | B2 | 1/2008 | Ovadia et al. |
| 2002/0083190 | A1* | 6/2002 | Kamiya et al. ................. 709/236 |

(Continued)

FOREIGN PATENT DOCUMENTS

| CN | 1972522 A | 5/2007 |
| CN | 101155016 A | 4/2008 |

(Continued)

OTHER PUBLICATIONS

Papadimitriou, "Generalized Multi-Protocol Label Switching (GMPLS) Signaling Extensions for G.709 Optical Transport Networks Control," Standards Track Memo, Jan. 2006, Request for Comments: 4328, The Internet Society, Reston, Virginia.

(Continued)

Primary Examiner — Obaidul Huq
(74) Attorney, Agent, or Firm — Leydig, Voit & Mayer, Ltd.

(57) ABSTRACT

A method, device, and system for multiplexing and mapping optical signals and demultiplexing and demapping optical signals are provided. The method for multiplexing and mapping optical signals includes the following steps: A label object that indicates a multiplexing and mapping relation is acquired. The label object includes a label and a label header. The label includes a type indication field and a TS indication field. The label object predefines a multiplexing and mapping policy about a first optical signal on a first optical channel and a second optical signal on a second optical channel. The first optical signal is multiplexed and mapped to the second optical signal according to the multiplexing and mapping policy. Therefore, when optical signals are multiplexed and mapped and are demultiplexed and demapped, so that an advantage of saving signaling overhead is realized.

10 Claims, 11 Drawing Sheets

(56) References Cited

U.S. PATENT DOCUMENTS

2003/0048813 A1 3/2003 Lahav et al.
2004/0264960 A1 12/2004 Maciocco et al.
2006/0104309 A1* 5/2006 Vissers et al. ............ 370/474

FOREIGN PATENT DOCUMENTS

| CN | 101179556 A | 5/2008 |
|----|-------------|--------|
| EP | 1278321 A1  | 1/2003 |
| EP | 1770886 A1  | 4/2007 |
| EP | 1826926 A1  | 8/2007 |

OTHER PUBLICATIONS

International Search Report in corresponding PCT Application No. PCT/CN2009/071334 (Jul. 23, 2009).

"G.709/Y.1331—Interfaces for the Optical Transport Network (OTN)," Mar. 2003, Series G: Transmission Systems And Media, Digital Systems and Networks, Digital Terminal Equipments—General and Series Y: Global Information Infrastructure, Internet Protocol Aspects And Next Generation Networks Internet Protocol Aspects—Transport, International Telecommunication Union, Geneva, Switzerland.

Papadimitriou, "RFC 4328—Generalized Multi-Protocol Label Switching (GMPLS) Signaling Extensions for G.709 Optical Transport Networks Control," Jan. 2006, The Internet Society, Reston, Virginia.

Written Opinion of the International Searching Authority in corresponding PCT Application No. PCT/CN2009/071334 (Jul. 23, 2009).

Extended European Search Report in corresponding European Application No. 09799950.2 (Oct. 19, 2011).

* cited by examiner

```
0                   1                   2                   3
0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            Reserved              |    t3    | t2 |t1|
+-+-+-+-+-+-+-+-+-+-+-+-+-+-+-+-+-+-+-+-+-+-+-+-+-+-+-+-+-+-+-+-+
```

```
0                   1                   2                   3
0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   |   |   |   |   |       Reserved           | M-TYPE|
+-+-+-+-+-+-+-+-+-+-+-+-+-+-+-+-+-+-+-+-+-+-+-+-+-+-+-+-+-+-+-+-+
```

A first label:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|0 0 0 0 0 0|0 0 0 1 0 0|0 0 0 1 0 1|0 0 1 0 0 0| Res |0|1 1 1 0|
+-+-+-+-+-+-+-+-+-+-+-+-+-+-+-+-+-+-+-+-+-+-+-+-+-+-+-+-+-+-+-+-+
```

| A first part of the ODU3 is multiplexed to a first TS. | The first part of the ODU3 is multiplexed to a fifth TS. | The first part of the ODU3 is multiplexed to a sixth TS. | The first part of the ODU3 is multiplexed to a ninth TS. | M-TYPE = 14 denotes that the ODU3 is multiplexed to an ODU4. |

FIG. 3e

A second label:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|0 0 1 0 1 0|0 0 1 0 1 1|0 0 1 1 0 0|0 0 1 1 0 1| Res |0|1 1 1 0|
+-+-+-+-+-+-+-+-+-+-+-+-+-+-+-+-+-+-+-+-+-+-+-+-+-+-+-+-+-+-+-+-+
```

| The first part of the ODU3 is multiplexed to a tenth TS. | The first part of the ODU3 is multiplexed to an eleventh TS. | The first part of the ODU3 is multiplexed to a twelfth TS. | The first part of the ODU3 is multiplexed to a thirteenth TS. | M-TYPE = 14 denotes that the ODU3 is multiplexed to the ODU4. |

FIG. 3f

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|       |         |         |           |               | M-TYPE|
+-+-+-+-+-+-+-+-+-+-+-+-+-+-+-+-+-+-+-+-+-+-+-+-+-+-+-+-+-+-+-+-+
```

FIG. 3i

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|             Length            | Class-Num (16)|     C-Type    |
+-+-+-+-+-+-+-+-+-+-+-+-+-+-+-+-+-+-+-+-+-+-+-+-+-+-+-+-+-+-+-+-+
|                             Label                             |
|                              ...                              |
+-+-+-+-+-+-+-+-+-+-+-+-+-+-+-+-+-+-+-+-+-+-+-+-+-+-+-+-+-+-+-+-+
```

METHOD, DEVICE, AND SYSTEM FOR MULTIPLEXING AND MAPPING OPTICAL SIGNALS AND DEMULTIPLEXING AND DEMAPPING OPTICAL SIGNALS

CROSS-REFERENCE TO RELATED APPLICATIONS

This application is a continuation of International Application No. PCT/CN2009/071334, filed on Apr. 17, 2009, which claims priority to China Patent Application No. 200810029598.1, filed on Jul. 21, 2008, both of which are hereby incorporated by reference in their entireties.

FIELD OF THE TECHNOLOGY

The present invention relates to the technology of an optical network, and more particularly to a method for multiplexing and mapping optical signals, a method for demultiplexing and demapping optical signals, a device for multiplexing and mapping optical signals, a device for demultiplexing and demapping optical signals, and an optical signal transmission system.

BACKGROUND OF THE INVENTION

An optical transport hierarchy (OTH) technology is a new generation standardized digital transport hierarchy structure, which is used to transport a payload on which corresponding adaptation is performed on an optical fiber transmission network. An optical transport network (OTN) based on the OTH is a transparent transport technology developed and formed for high-capacity and coarse granule scheduling requirements of a backbone network hierarchy, and the OTN adopts a digital envelope technology. The OTN provides a new generation optical transport platform which is manageable, operable and highly efficient for network operators and clients.

FIG. 1 shows a multiplexing and mapping relation of OTN signals defined in the ITU-T G.709. As shown in FIG. 1, the name of each unit in FIG. 1 is as follows: an optical channel payload unit (OPU), an optical channel data unit (ODU), an optical channel transport unit (OTU), and an optical channel data tributary unit group (ODTUG).

It can be seen from FIG. 1 that multiplexing and mapping of OTN signals mainly include following six situations:
1. client signal (such as Synchronous Transfer Mode (STM)-16)->OPU1->ODU1->OTU1
2. client signal (such as STM-64)->OPU2->ODU2->OTU2
3. client signal (such as STM-256)->OPU3->ODU3->OTU3
4. client signal*4 (such as STM-16)->OPU1*4->ODU1*4->ODTUG2->OPU2->ODU2->OTU2
5. client signal*16 (such as STM-16)->OPU1*16->ODU1*16->ODTUG3->OPU3->ODU3->OTU3
6. client signal*4 (such as STM-64)->OPU2*4->ODU2*4->ODTUG3->OPU3->ODU3->OTU3

When a path is established through generalized multi-protocol label switching (GMPLS) signaling, how an ODUk is multiplexed into an ODUj (j>k) must be specified. For example, in Situation 4, the ODU2 has four tributary slots (TSs) and the signaling has to specify which one of the four TSs of the ODU2 signal of the ODU1 is mapped to.

RFC4328 describes signaling extension for the OTN defined by the ITU-T G.709 and describes label definition of the OTN. This label definition is able to indicate how the ODUk is multiplexed into the ODUj (j>k).

A label defined by the RFC4328 is as shown in FIG. 1a:
t1:
t1=1, which indicates that it is an ODU1 signal; and
t1=0, which indicates that it is not an ODU1 signal.
t2:
t2=1, which indicates that it is an ODU2 signal; and
t2=2, 3, 4, 5, which indicates that an ODU1 signal is mapped to a certain one of four TSs of an ODTUG2, for example, t2=2 corresponds to a first TS, t2=3 corresponds to a second TS, and so on. The ODTUG2 is then mapped to the ODU2, and then mapped to the OTU2.
t2=0, which indicates that it is not the ODU1 or ODU2 signal.
t3:
t3=1, which indicates that it is an ODU3 signal; and
t3=2, 3, . . . , 17, which indicates that the ODU1 signal is mapped to a certain one of sixteen TSs of the ODTUG3, for example, t3=2 corresponds to a first TS, t3=3 corresponds to a second TS, and so on. The ODTUG3 is then mapped to the ODU3, and then mapped to the OTU3.
t3=18, 19, . . . , 33, which indicates that the ODU2 signal is mapped to a certain one of sixteen TSs of the ODTUG3. As four TSs need to be occupied when the ODU2 is multiplexed to the ODU3, in this case, four labels are needed to indicate which four TSs of the ODTUG3 are occupied by the ODU2 respectively.

For example, an ODU2 is multiplexed into an ODU3. If four parts of the ODU2 are mapped to a first, fifth, sixth, and ninth TS of the ODTUG3 respectively, the following four labels are needed.

A first label: t3=18, t2=0, and t1=0, which indicates that a first part of the ODU2 is mapped to the first TS of the ODTUG3.

A second label: t3=22, t2=0, and t1=0, which indicates that a second part of the ODU2 is mapped to the fifth TS of the ODTUG3.

A third label: t3=23, t2=0, and t1=0, which indicates that a third part of the ODU2 is mapped to the sixth TS of the ODTUG3.

A fourth label: t3=26, t2=0, and t1=0, which indicates that a fourth part of the ODU2 is mapped to the ninth TS of the ODTUG3.

In an innovating process of the present invention, the inventor finds that the prior art at least has the following disadvantages:

When an ODUk signal is multiplexed to an ODUj (k<j) signal, in most cases, multiple labels are required to specify each multiplexed TS. For example, when an ODU2 signal needs to be multiplexed to an ODU3, four labels (4*32 bit) need to be carried in a label request of the signaling, which specify which four TSs are multiplexed to the ODU3. Furthermore, if a label definition thought of the RFC4328 is adopted to extend a label format to support an ODU0 and an ODU4, in many cases, more labels are needed to specify the multiplexing and mapping relation (for example, in a case that a base unit is the ODU0, when the ODU3 is multiplexed to the ODU4, thirty two labels are needed to indicate which 32 TSs of the ODU4 thirty two parts of the ODU3 are mapped to respectively). In a case that the ODUk signal is multiplexed to the ODUj (k<j) signal and multiple labels need to be carried in the label request of the signaling, existing labels is adopted so that signaling overhead in networks is increased, and content expressed by the labels is obscure, so that the expression of TS is difficult to understand and conversion is needed.

SUMMARY OF THE INVENTION

Accordingly, the present invention is directed to a method, device, and system for multiplexing and mapping optical signals and demultiplexing and demapping optical signals, to increase utilization of a label object and decrease signaling overhead.

In an embodiment, the present invention provides a method for multiplexing and mapping optical signals. The method includes the following steps: A label object that indicates a multiplexing and mapping relation is acquired. The label object includes a label and a label header. The label includes a type indication field and a tributary slot (TS) indication field. The label object predefines a multiplexing and mapping policy about a first optical signal on a first optical channel and a second optical signal on a second optical channel. The multiplexing and mapping policy includes a matching relation between a type of the first optical signal and a type of the second optical signal indicated by the type indication field, and a TS of the second optical signal occupied by each part of the first optical signal when the first optical signal is multiplexed and mapped to the second optical signal according to the matching relation, where the matching relation is indicated by the type indication field and the TS is indicated by the TS indication field. The first optical signal is multiplexed and mapped to the second optical signal according to the multiplexing and mapping policy.

Correspondingly, in an embodiment, the present invention further provides a method for demultiplexing and demapping optical signals The method includes the following steps: A label object including a label and a label header is parsed, to obtain a multiplexing and mapping policy with which a first optical signal on a first optical channel is multiplexed and mapped to a second optical signal on a second optical channel, where the multiplexing and mapping policy is predefined by the label in the label object. The label includes a type indication field and a TS indication field. The second optical signal is demultiplexed and demapped to the first optical signal according to the multiplexing and mapping policy. The multiplexing and mapping policy includes a matching relation between a type of the first optical signal and a type of the second optical signal, and a TS of the second optical signal occupied by each part of the first optical signal when the first optical signal is multiplexed and mapped to the second optical signal according to the matching relation, where the matching relation is indicated by the type indication field and the TS is indicated by the TS indication field.

In an embodiment, the present invention provides a device for multiplexing and mapping optical signals. The device includes a label storage module and a multiplexing and mapping module. The label storage module is configured to store a label object indicating a multiplexing and mapping relation. The label object includes a label and a label header. The label includes a type indication field and a TS indication field. The label object predefines a multiplexing and mapping policy about a first optical signal on a first optical channel and a second optical signal on a second optical channel. The multiplexing and mapping policy includes a matching relation between a type of the first optical signal and a type of the second optical signal, and a TS of the second optical signal occupied by each part of the first optical signal when the first optical signal is multiplexed and mapped to the second optical signal according to the matching relation, where the matching relation is indicated by the type indication field and the TS is indicated by the TS indication field. The multiplexing and mapping module is configured to multiplex and map the first optical signal of the first optical channel to the second optical signal of the second optical channel according to the multiplexing and mapping policy.

Correspondingly, in an embodiment, the present invention further provides a device for demultiplexing and demapping optical signals. The device includes a parsing module and a demultiplexing and demapping module. The parsing module is configured to parse a label object including a label and a label header, to obtain a multiplexing and mapping policy with which a first optical signal on a first optical channel is multiplexed and mapped to a second optical signal on a second optical channel, where the multiplexing and mapping policy is predefined by the label in the label object. The label includes a type indication field and a TS indication field. The demultiplexing and demapping module is configured to demultiplex and demap the second optical signal to the first optical signal according to the multiplexing and mapping policy. The multiplexing and mapping policy includes a matching relation between a type of the first optical signal and a type of the second optical signal, and a TS of the second optical signal occupied by each part of the first optical signal when the first optical signal is multiplexed and mapped to the second optical signal according to the matching relation, where the matching relation is indicated by the type indication field and the TS is indicated by the TS indication field.

In an embodiment, the present invention further provides an optical signal transmission system. The system includes a first optical channel, a multiplexing and mapping device, a second optical channel, and a demultiplexing and demapping device. The first optical channel is configured to bear a first optical signal to be multiplexed and mapped. The multiplexing and mapping device is configured to multiplex and map the first optical signal on a first optical channel to a second optical signal on a second optical channel according to a multiplexing and mapping policy predefined by a label object. The label object includes a label and a label header. The label includes a type indication field and a TS indication field. The multiplexing and mapping policy includes a matching relation between a type of the first optical signal and a type of the second optical signal, and a TS of the second optical signal occupied by each part of the first optical signal when the first optical signal is multiplexed and mapped to the second optical signal according to the matching relation, where the matching relation is indicated by the type indication field and the TS is indicated by the TS indication field. The second optical channel is configured to bear the second optical signal. The demultiplexing and demapping device is configured to demultiplex and demap the second optical signal of the second optical channel to the first optical signal of the first optical channel according to the multiplexing and mapping policy.

In an embodiment, the present invention further provides a label generation method. The method includes the following steps: A type indication field is generated. The type indication field indicates a matching relation between a type of a first optical signal and a type of a second optical signal. A TS indication field is generated. The TS indication field indicates a TS of the second optical signal occupied by each part of the first optical signal when the first optical signal is multiplexed and mapped to the second optical signal according to the matching relation. A label object is generated according to the type indication field and the TS indication field.

In an embodiment, the present invention further provides a corresponding label generation device. The device includes a first generation module, a second generation module, and a third generation module. The first generation module is configured to generate a type indication field. The type indication field indicates a matching relation between a type of a first optical signal and a type of a second optical signal. The second generation module is configured to generate a TS indication field. The TS indication field indicates a TS of the second optical signal occupied by each part of the first optical signal when the first optical signal is multiplexed and mapped to the second optical signal according to the matching relation. The third generation module is configured to generate a label object according to the type indication field and the TS indication field.

In the technical solutions according to the embodiments of the present invention, the multiplexing and mapping relation and the TS occupied during multiplexing and mapping are indicated in the same label, and for a case that multiple label objects need to be carried in signaling during the multiplexing and mapping in the prior art, only one or a few label objects need to be carried in signaling in the technical solutions provided according to the embodiments of the present invention, so that utilization of the label object is increased and signaling overhead is decreased.

BRIEF DESCRIPTION OF THE DRAWINGS

To make the technical solution under the present invention clearer, the accompanying drawings for illustrating the embodiments of the present invention or the prior art are outlined in the following. Apparently, the accompanying drawings are for the exemplary purpose only, and person having ordinary skill in the art can derive other drawings from such accompanying drawings without any creative effort.

FIG. 3a to FIG. 3i are schematic structural views of a label according to an embodiment of the present invention respectively;

FIG. 4 is a schematic structural view of a complete label object according to an embodiment of the present invention;

DETAILED DESCRIPTION OF THE EMBODIMENTS

The technical solution of the present invention is hereinafter described in detail with reference to the accompanying drawings. It is evident that the embodiments are only exemplary embodiments of the present invention and the present invention is not limited to such embodiments. Those skilled in the art can derive other embodiments from the embodiments provided herein without creative work, and all such embodiments are covered in the scope of protection of the present invention.

Figure 1:
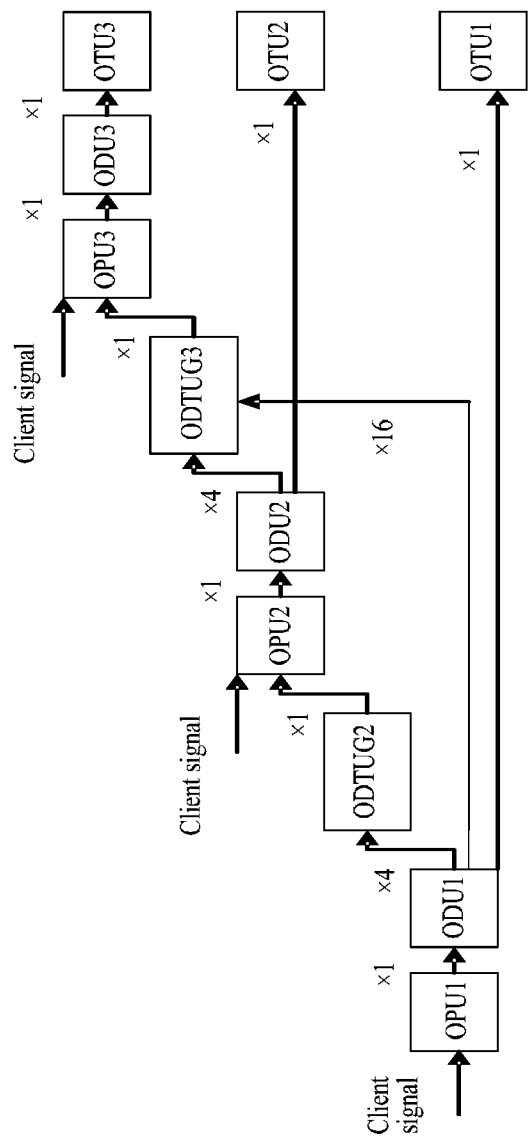
FIG. 1 is a schematic diagram of multiplexing and mapping of OTN signals in the prior art.
Figures 1A, 2, 3:
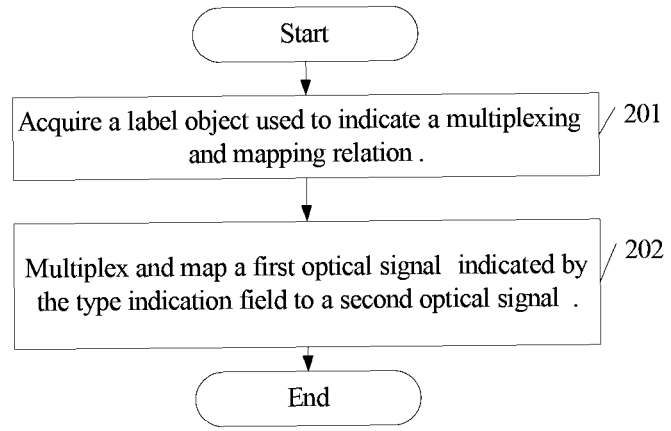
FIG. 1a is a schematic structural view of an existing label.
FIG. 2 is a schematic flow chart of a method for multiplexing and mapping optical signals according to an embodiment of the present invention.
FIG. 3 is a schematic structural view of a label according to an embodiment of the present invention.

FIG. 2 is a schematic flow chart of a method for multiplexing and mapping optical signals according to an embodiment of the present invention.

The method for multiplexing and mapping optical signals according to the embodiment of the present invention specifically includes the following steps:

Step 201: Acquire a label object that indicates a multiplexing and mapping relation. The label object includes a label and a label header. The label includes a type indication field and a tributary slot (TS) indication field.

The label object predefines a multiplexing and mapping policy about a first optical signal on a first optical channel and a second optical signal on a second optical channel. The multiplexing and mapping policy can include a matching relation between a type of the first optical signal and a type of the second optical signal, and a TS of the second optical signal occupied by each part of the first optical signal when the first optical signal is multiplexed and mapped to the second optical signal according to the matching relation, where the matching relation is indicated by the type indication field and the TS is indicated by the TS indication field.

Step 202: Multiplex and map the first optical signal to the second optical signal according to the multiplexing and mapping policy.

Multiplexing and mapping refer to that a first optical signal ODUk is mapped to a second optical signal OTUk or the first optical signal ODUk is multiplexed to a second optical signal ODUj (j>k). The mapping of the first optical signal ODUk to the second optical signal OTUk refers to a process that a client signal is encapsulated into an optical channel payload unit OPUk, mapped to the ODUk, and then mapped to the OTUk. The multiplexing of the first optical signal ODUk to a second optical signal OTUj refers to a process that the client signal is encapsulated into the OPUk, mapped to the ODUk, and then mapped to a certain one or multiple TSs in an optical channel data tributary unit group (ODTUGj), and the ODTUGj is mapped to an OPUj, then mapped to the ODUj, and then mapped to the OTUj.

The type indication field indicates the matching relation between the type of the first optical signal and the type of the second optical signal. The TS indication field indicates each TS of the second optical signal occupied by each part of the first optical signal when the first optical signal is multiplexed and mapped to the second optical signal according to the matching relation.

The type indication field occupies a first portion of bits in the label object. The TS indication field occupies a second portion of bits in the label object. The second portion of bits refer to part or all of the bits except the first portion of bits in the label object. The number of bits in the second portion of bits can be a fixed number and can also be an unfixed number.

It should be noted that multiple labels can be in one label object and the label object includes a label header and at least one label. A specific composition of the label and the label object and their relation can be seen in FIGS. 3, 3a to 3i, and 4.

In addition to the type indication field and the TS indication field, one label can further include a base unit indication field of an optical signal. In a case that the label is extended to support an ODU0 and an ODU4, the label of the label object can include the base unit indication field. Alternatively, by using a method of assigning one new value to C-TYPE, a base unit is indicated by the label header in the label object (that is, when a value of the C-TYPE is equal to the newly assigned value, it indicates that the label in the label object is an optical transport network (OTN) label and the base unit is the ODU0). At this time, the C-TYPE is used as the base unit indication field. Correspondingly, the multiplexing and mapping policy further includes a base unit of the first optical signal and the second optical signal, where the base unit is indicated by the base unit indication field.

The label object in the embodiment separately indicates "a type of an optical signal" and "an occupied TS". A field is added in the label object to indicate "a type of an optical signal" (which can indicate whether the ODUk is multiplexed to the ODUj or the ODUk is mapped to the OTUk). Other bits indicate into which TSs of the ODUj are multiplexed and mapped or into which TSs of the OTUk are mapped in a form of actual physical values.

FIG. 3 is a schematic structural view of a format of a label according to an embodiment of the present invention. As shown in FIG. 3, a type indication field M-TYPE occupies four bits, which indicates a type of two multiplexed and mapped optical signals, that is, which can also be understood as a multiplexing and mapping relation. For example, the following method can be used for identification.

M-TYPE=01 indicates that an ODU1 is mapped to an OTU1.

M-TYPE=02 indicates that an ODU2 is mapped to an OTU2.

M-TYPE=03 indicates that an ODU3 is mapped to an OTU3.

M-TYPE=04 indicates that an ODU1 is multiplexed to an ODU2. In such case, first two bits in the label can be used as a TS indication field, to indicate which one of four TSs in an ODTUG2 is occupied by the ODU1. For example, 00 indicates that a first TS is occupied, 01 indicates that a second TS is occupied, and so on.

M-TYPE=05 indicates that an ODU1 is multiplexed to an ODU3. At this time, first four bits in the label can be used as a TS indication field, to indicate which one of sixteen TSs in an ODTUG3 is occupied by the ODU1. For example, 0000 indicates that a first TS is occupied, 0001 indicates that a second TS is occupied, and so on.

M-TYPE=06 indicates that an ODU2 is multiplexed to an ODU3. In such case, first sixteen bits in the label can be used as a TS indication field. The 16 bits are divided into four groups, each of which has four bits. The four groups of fields each indicates to which one of the sixteen TSs of the ODTUG3 the four parts of the ODU2 are respectively multiplexed.

It can be seen from the foregoing example that under different multiplexing and mapping relations, in the TS indication field in the label, two bits or four bits may be needed to indicate one TS. That is, the number of bits occupied by the TS indication field may not be a constant number.

In the following example, the format of the label and the meaning indicated by the value of M-TYPE are the same with the foregoing definition.

Figure 3A:
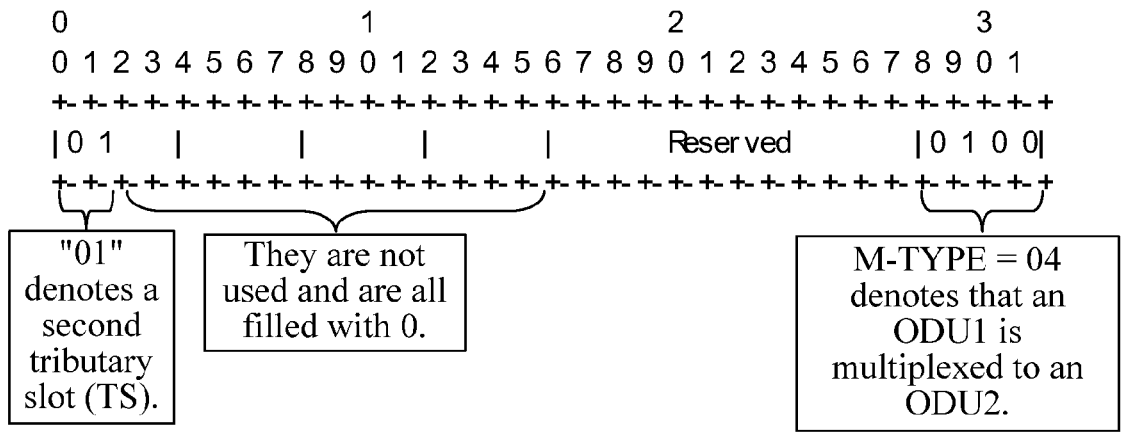

(1) An ODU1 is multiplexed to an ODU2: if the ODU1 is mapped to a second TS of an ODTUG2, the label is as shown in FIG. 3a.

Figure 3B:
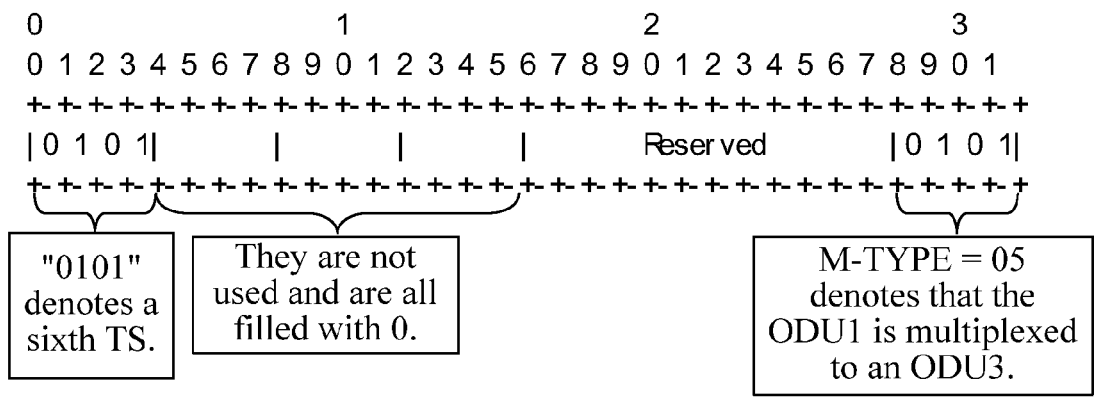

(2) An ODU1 is multiplexed to an ODU3: if the ODU1 is mapped to a sixth TS of an ODTUG3, the label is as shown in FIG. 3b.

Figure 3C:
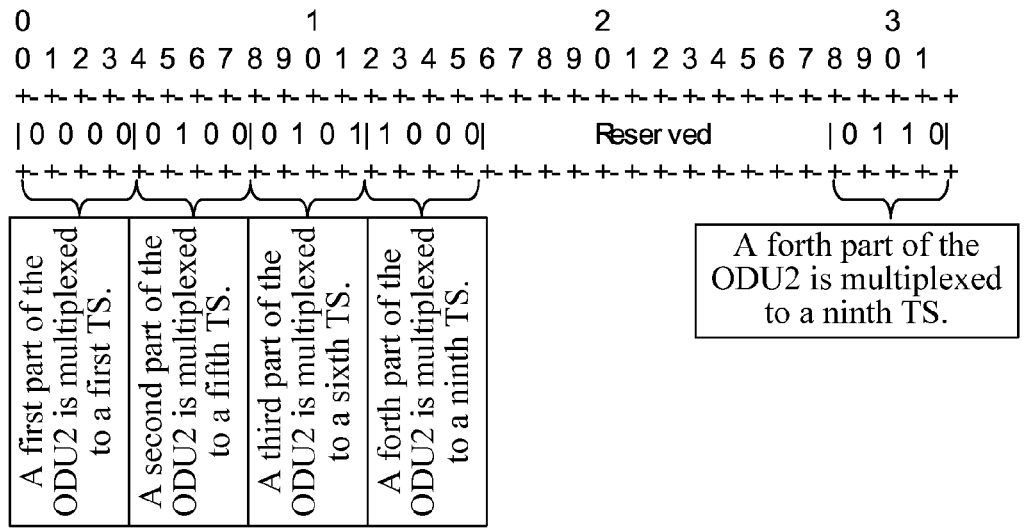

(3) An ODU2 is multiplexed to an ODU3: if the ODU2 is mapped to the ODU3, in which four parts of the ODU2 are respectively multiplexed into a first, fifth, sixth, and ninth TS of an ODTUG3, the label is as shown in FIG. 3c.

In the embodiment of the present invention, only one label is needed to clearly indicate a multiplexing relation from the ODU2 to the ODU3.

Figure 3D:
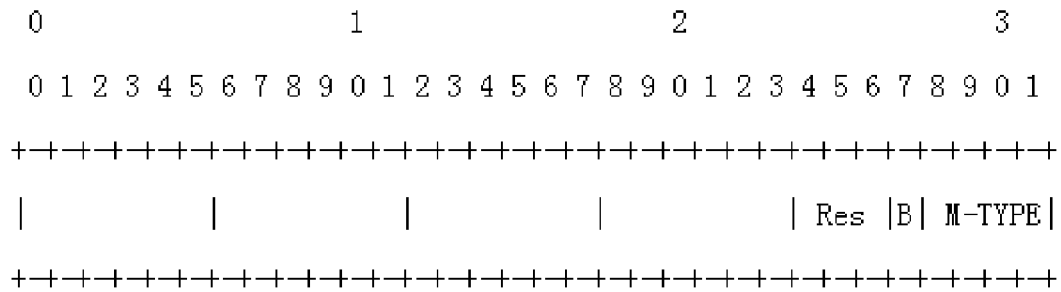
Figure 3G:
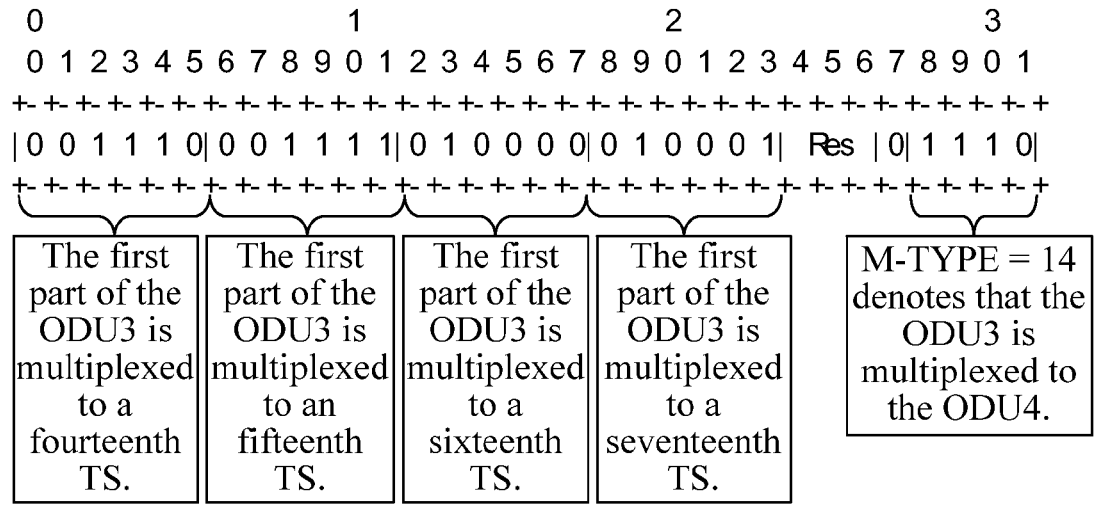
Figure 3H:
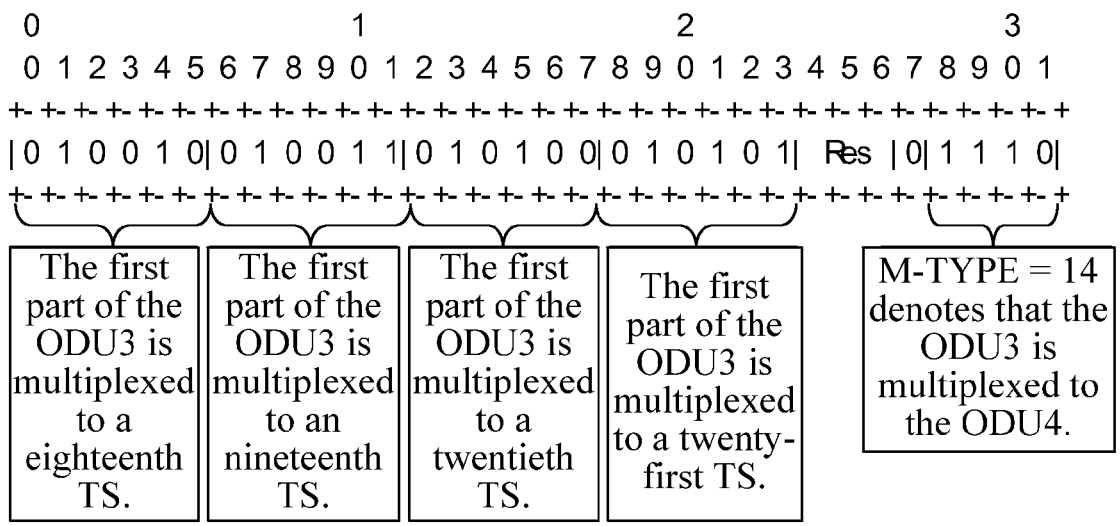
Figure 5:
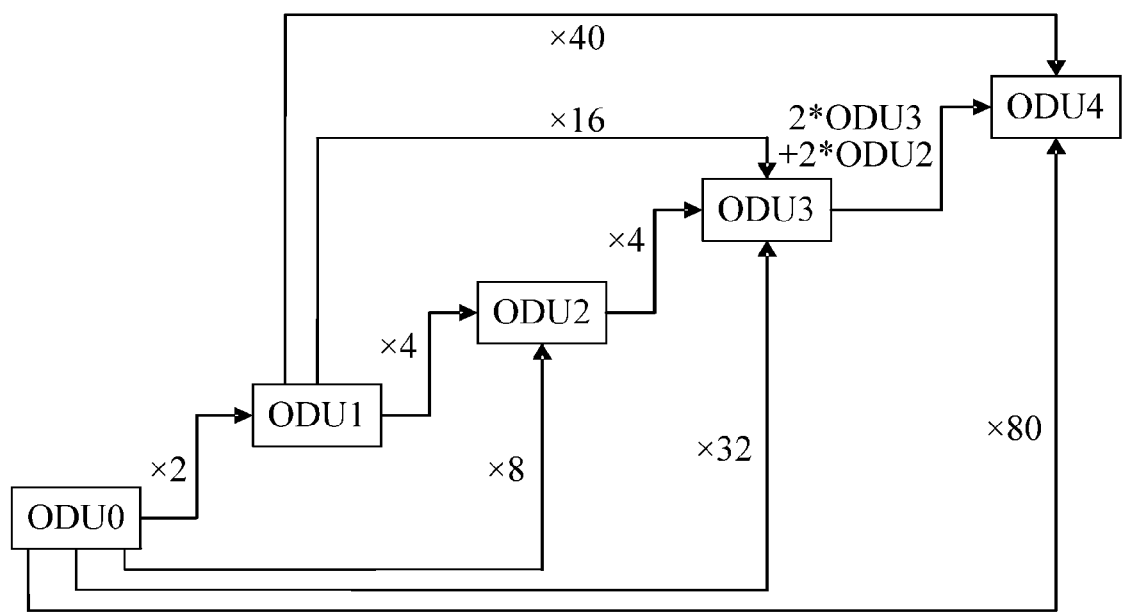
FIG. 5 is a view of a multiplexing and mapping relation among ODU0, ODU1, ODU2, ODU3, and ODU4 in the prior art.
Figure 6:
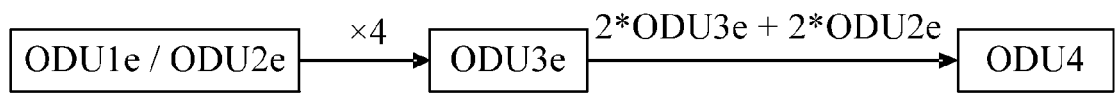
FIG. 6 is a view of a multiplexing and mapping relation among ODU1e, ODU2e, ODU3e, and ODU4 in the prior art.

Through the label definition mode of the present invention, the label format can be easily extended to support an ODU0, an ODU4, an ODU1e/ODU2e, and so on. FIG. 5 is a view of a multiplexing and mapping relation among an ODU0, an ODU1, an ODU2, an ODU3, and an ODU4. As shown in FIG. 5, a switching granularity of an ODU1e and an ODU2e is 10G, and a switching granularity of an ODU3e is 40G. FIG. 6 is a view of a multiplexing and mapping relation among an ODU1e, an ODU2e, an ODU3e, and an ODU4. In these cases, a format of a label in an embodiment of the present invention is as shown in FIG. 3d.

A base unit indication field B of an optical signal occupies one bit, which indicates a base unit of the optical signal.

B=1 indicates that the base unit of the signal is the ODU0. In such case, the ODU1 has two TSs in total, the ODU2 has eight TSs in total, the ODU3 has thirty two TSs in total, and the ODU4 has eighty TSs in total.

B=0 indicates that the base unit of the signal is the ODU1. In such case, the ODU2 has four TSs in total, the ODU3 has sixteen TSs in total, and the ODU4 has forty TSs in total.

A type indication field M-TYPE occupies four bits to indicate a multiplexing and mapping relation. For example, the following multiplexing and mapping relation can be adopted.

M-TYPE=01 indicates that an ODU1 is mapped to an OTU1.

M-TYPE=02 indicates that an ODU2 is mapped to an OTU2, or an ODU1e is mapped to an OTU1e, or an ODU2e is mapped to an OTU2e.

M-TYPE=03 indicates that an ODU3 is mapped to an OTU3, or an ODU3e is mapped to an OTU3e.

M-TYPE=04 indicates that an ODU1 is multiplexed to an ODU2.

When an ODU1 needs to be multiplexed to an ODU2, if B=0, first two bits in the label can be used as a TS indication field, to indicate which one of four TSs in an ODTUG2 is occupied by the ODU1. For example, 00 indicates that a first TS is occupied, 01 indicates that a second TS is occupied, and so on.

If B=1, first 6 bits in the label can be used as a TS indication field. The 6 bits are divided into two groups, each of which has three bits. The two groups of fields each indicate to which one of eight TSs of the ODTUG2 two parts of the ODU1 are respectively multiplexed.

M-TYPE=05 indicates that an ODU1 is multiplexed to an ODU3.

When the ODU1 needs to be multiplexed to the ODU3, if B=0, first four bits in the label can be used as a TS indication field, to indicate which one of sixteen TSs in an ODTUG3 is occupied by the ODU1. For example, 0000 indicates that a first TS is occupied, 0001 indicates that a second TS is occupied, and so on.

If B=1, first 10 bits in the label can be used as a TS indication field. The 10 bits are divided into two groups, each of which has five bits. The two groups each indicate to which one of thirty two TSs of the ODTUG3 two parts of the ODU1 are separately multiplexed.

M-TYPE=06 indicates that an ODU2 is multiplexed to an ODU3.

When the ODU2 needs to be multiplexed to the ODU3, if B=0, first sixteen bits in the label can be used as a TS indication field. The 16 bits are divided into four groups, each of which has four bits. The four groups of fields each indicate to which one of sixteen TSs of the ODTUG3 four parts of the ODU2 are separately multiplexed.

If B=1, two labels are needed to indicate a multiplexing relation. First 20 bits in each label can be used as a TS indication field. The 20 bits are divided into four groups, each of which has 5 bits. The eight fields each indicate to which one of thirty two TSs of the ODTUG3 eight parts of the ODU2 are separately multiplexed.

Further, M-TYPE=06 can further indicate that an ODU1e/ODU2e is multiplexed to an ODU3e.

M-TYPE=07 indicates that an ODU0 is mapped to an OTU0.

M-TYPE=08 indicates that the ODU0 is multiplexed to the ODU1 (B must be 0). In such case, first 1 bit in the label can be used as a TS indication field, to indicate which one of two TSs in an ODTUG1 is occupied by the ODU0. For example, 0 indicates that a first TS is occupied and 1 indicates that a second TS is occupied.

M-TYPE=09 indicates that an ODU0 is multiplexed to an ODU2 (B must be 0). In such case, first 3 bits in the label can be used as a TS indication field, to indicate which one of eight TSs in an ODTUG2 is occupied by the ODU0. For example, 000 indicates that a first TS is occupied, 001 indicates that a second TS is occupied, and so on.

M-TYPE=10 indicates that an ODU0 is multiplexed to an ODU3 (B must be 0). In such case, first 5 bits in the label can be used as a TS indication field, to indicate which one of thirty two TSs in an ODTUG3 is occupied by the ODU0. For example, 00000 indicates that a first TS is occupied, 00001 indicates that a second TS is occupied, and so on.

M-TYPE=11 indicates that an ODU0 is multiplexed to an ODU4 (B must be 0). In such case, first seven bits in the label can be used as a TS indication field, to indicate which one of eighty TSs in an ODTUG4 is occupied by the ODU0. For example, 0000000 indicates that a first TS is occupied, 0000001 indicates that a second TS is occupied, and so on.

M-TYPE=12 indicates that an ODU1 is multiplexed to an ODU4.

When the ODU1 needs to be multiplexed to the ODU4, if B=0, first 6 bits in the label can be used as a TS indication field, to indicate which one of forty TSs in an ODTUG4 is occupied by the ODU1. For example, 000000 indicates that a first TS is occupied, 000001 indicates that a second TS is occupied, and so on.

If B=1, first 14 bits in the label can be used as a TS indication field, and the 14 bits are divided into two groups, seven bits for each group. The two groups each indicate to which one of eighty TSs of the ODTUG4 two parts of the ODU1 are separately multiplexed.

M-TYPE=13 indicates that an ODU2/ODU2e is multiplexed to an ODU4.

When the ODU2/ODU2e needs to be multiplexed to the ODU4, if B=0, first 24 bits in the label can be used as a TS indication field, and the 24 bits are divided into four groups, each of which has six bits. The four groups each indicate to which one of forty TSs of the ODTUG4 four parts of the ODU2 are separately multiplexed.

If B=1, three labels are needed to indicate a multiplexing relation from the ODU2 to the ODU4. In the three labels, first 21 bits in each label can be used as a TS indication field, and the 21 bits are divided into three groups, each of which has seven bits. The nine groups each indicate to which one of eighty TSs of the ODTUG4 eight parts of the ODU2 are separately multiplexed. The three labels can form one label object. For a case that multiple labels exist in the following, one label object can also be similarly formed to illustrate multiplexing relations among different signals.

M-TYPE=14 indicates that an ODU3/ODU3e is multiplexed to an ODU4.

When the ODU3/ODU3e needs to be multiplexed to the ODU4, if B=0, four labels are needed to indicate a multiplexing relation from the ODU3 to the ODU4. In the four labels, first 24 bits in each label can be used as a TS indication field, and the 24 bits are divided into four groups, each of which has six bits. The sixteen groups each indicate to which one of forty TSs of the ODTUG4 four parts of the ODU3 are separately multiplexed.

If B=1, eleven labels are needed to indicate a multiplexing relation from the ODU3 to the ODU4. In the eleven labels, first 21 bits in each label can be used as a TS indication field, and the 21 bits are divided into three groups, each of which has seven bits. The thirty-three groups each indicate to which one of eighty TSs of the ODTUG4 thirty-two parts of the ODU2 are separately multiplexed.

M-TYPE=15 indicates that an ODU4 is multiplexed to an OTU4.

For example, an ODU3 is multiplexed into the ODU4, and a base signal is an ODU1. If sixteen parts of the ODU3 are multiplexed into a first, fifth, sixth, ninth, tenth, eleventh, twelfth, thirteenth, fourteenth, fifteenth, sixteenth, seventeenth, eighteenth, nineteenth, twentieth, twenty-first TSs of the ODTUG4 respectively, four labels are required. Their label values are shown in FIGS. 3e to 3h.

During implementation of the method for multiplexing and mapping optical signals according to the embodiment of the present invention, all possible multiplexing and mapping situations can be indicated by less labels (32 bits for each label). Compared with the definition mode of the label object in the prior art, the definition mode of the label object according to the embodiment of the present invention makes content of each field of the label object clear and distinct, and the way in which the ODUk is multiplexed into the ODUj (j>k) can be indicated with an actual physical value, so that signaling overhead is decreased, which is specifically as shown in Table 1.

TABLE 1

| Multiplexing and mapping relation | Quantity of labels needed in the present invention (B = 0/B = 1) | Quantity of labels needed in the prior art (B = 0/B = 1) |
| --- | --- | --- |
| ODU0 to OTU0 | —/1 | —/1 |
| ODU0 to ODU1 | —/1 | —/1 |
| ODU0 to ODU2 | —/1 | —/1 |
| ODU0 to ODU3 | —/1 | —/1 |
| ODU0 to ODU4 | —/1 | —/1 |
| ODU1 to OTU1 | 1/1 | 1/1 |
| ODU1 to ODU2 | 1/1 | 1/2 |
| ODU1 to ODU3 | 1/1 | 1/2 |
| ODU1 to ODU4 | 1/1 | 1/2 |
| ODU2 to OTU2 | 1/1 | 1/1 |
| ODU2 to ODU3 | 1/2 | 4/8 |
| ODU2 to ODU4 | 1/3 | 4/8 |
| ODU3 to OTU3 | 1/1 | 1/1 |
| ODU3 to ODU4 | 4/11 | 16/32 |
| ODU4 to OTU4 | 1/1 | 1/1 |

In addition, under different multiplexing and mapping relations, the number of bits occupied by the TS indication field in the label can also be a fixed number, an example of which is as follows.

In this example, a complete label object format is as shown in FIG. 4.

Length, Class-Num, and C-Type are headers of the label object. Class-Num=16 indicates that a label is placed in the object and C-Type illustrates what type of label it is. However, the label format in the foregoing embodiments correspondingly is changed as shown in FIG. 3i.

It is illustrated in two cases.

(1) In one case, only the fixed length label format of the ODU1/2/3 is supported. If four TSs are placed in one label at most, each TS occupies 7 bits. In this case, each of the various multiplexing needs one label only, and a first TS can be indicated by 0, a second TS can be indicated by 1, and so on. Further, the first TS can be indicated by 0, the second TS can be indicated by 1, and so on. In this example, the latter one is used for illustration.

For example, when an ODU1 is multiplexed to an ODU2, the first seven bits (instead of two bits in a solution of the unfixed number) indicate to which TS in an OPU2 the ODU1 is mapped. 0000001 indicates the first TS and 0000010 indicates the second TS.

When an ODU1 is multiplexed to an ODU3, the first seven bits (instead of four bits in a solution of the unfixed number) indicate to which TS in the OPU3 the ODU1 is mapped. 0000001 indicates the first TS and 0000010 indicates the second TS, and so forth.

When an ODU2 is multiplexed to an ODU3, the first seven bits indicate to which TS in an OPU3 a first part of the ODU2 is mapped, the second seven bits indicate to which TS in the OPU3 a second part of the ODU2 is mapped, and so forth.

(2) In the other case, extension label formats which support an ODU0, an ODU4, and an ODUe.

If the base unit is an ODU1, the label format is unchanged, and only an M-TYPE type needs to be added (for example, definition of M-TYPE=07-15 in the solution of the unfixed number can continue to be used).

For example, When an ODU2 is multiplexed to an ODU4 (M-TYPE=13), one label is needed to indicate a mapping relation from four parts of the ODU2 to the ODU4. First seven bits in the label indicate to which TS in the OPU4 a first part of the ODU2 is mapped, second seven bits indicate which TS in the OPU4 a second part of the ODU2 is mapped, and so forth.

When an ODU3 is multiplexed to the ODU4 (M-TYPE=14), four labels are needed, and each label includes four fields of 7 bits. The sixteen fields each indicate to which TS of the ODU4 sixteen parts of the ODU3 are separately mapped.

In other multiplexing and mapping cases, the situation is also similar.

If the base unit is the ODU0, the base unit can be indicated by using a method of assigning one new value to the C-TYPE (that is, when a value of the C-TYPE is equal to the newly assigned value, it indicates that the label in the label object is an OTN label, and the base unit is the ODU0). At this time, the C-TYPE is used as the base unit indication field. Similarly, the definition of the M-TYPE in the label is the same with the definition in a case that the base unit is the ODU1. Four TSs are placed in one label at most, and each TS occupies 7 bits.

For example, when the ODU1 is multiplexed to the ODU4 (the C-TYPE indicates that the base unit is the ODU0, and M-TYPE=12), one label is needed to indicate a mapping relation between two parts of the ODU1 to the ODU4. First seven bits in the label indicate to which TS in the OPU4 a first part of the ODU1 is mapped, and second seven bits indicate to which TS in the OPU4 a second part of the ODU1 is mapped.

When the ODU3 is multiplexed to the ODU4 (the C-TYPE indicates that the base unit is the ODU0, and M-TYPE=14), eight labels are needed, and each label includes four fields of 7 bits. The thirty two fields each indicate to which TS of the ODU4 thirty two parts of the ODU3 are separately mapped.

In other multiplexing and mapping cases, the process is also similar.

Table 2 is the contrast between the label usage case in this example and the label usage case in the prior art. In a multiplexing and mapping (such as ODU2 to ODU3) case, the number of labels used in the embodiment of the present invention is far less than the number of labels used in the prior art.

TABLE 2

| Multiplexing relation | The number of labels needed in the present invention (the base unit is ODU1/ODU0) | The number of labels needed in RFC4328 (the base unit is ODU1/ODU0) |
| --- | --- | --- |
| ODU0 to OTU0 | —/1 | —/1 |
| ODU0 to ODU1 | —/1 | —/1 |
| ODU0 to ODU2 | —/1 | —/1 |
| ODU0 to ODU3 | —/1 | —/1 |
| ODU0 to ODU4 | —/1 | —/1 |
| ODU1 to OTU1 | 1/1 | 1/1 |
| ODU1 to ODU2 | 1/1 | 1/2 |
| ODU1 to ODU3 | 1/1 | 1/2 |
| ODU1 to ODU4 | 1/1 | 1/2 |
| ODU2 to OTU2 | 1/1 | 1/1 |
| ODU2 to ODU3 | 1/2 | 4/8 |
| ODU2 to ODU4 | 1/2 | 4/8 |
| ODU3 to OTU3 | 1/1 | 1/1 |
| ODU3 to ODU4 | 4/8 | 16/32 |
| ODU4 to OTU4 | 1/1 | 1/1 |

The following two label formats are illustrated in the embodiment: "A TS is indicated by an unfixed length bit, and a base unit is indicated with a B bit", and "a TS is indicated by a fixed length bit, and a base unit is indicated with the C-TYPE". However, the label formats can be that, "a TS is indicated by an unfixed length bit, and a base unit is indicated with the C-TYPE", and "a TS is indicated by a fixed length bit, and a base unit is indicated with a B bit". The specific case is also similar to the foregoing illustration, the description of which is omitted here.

Figure 7:
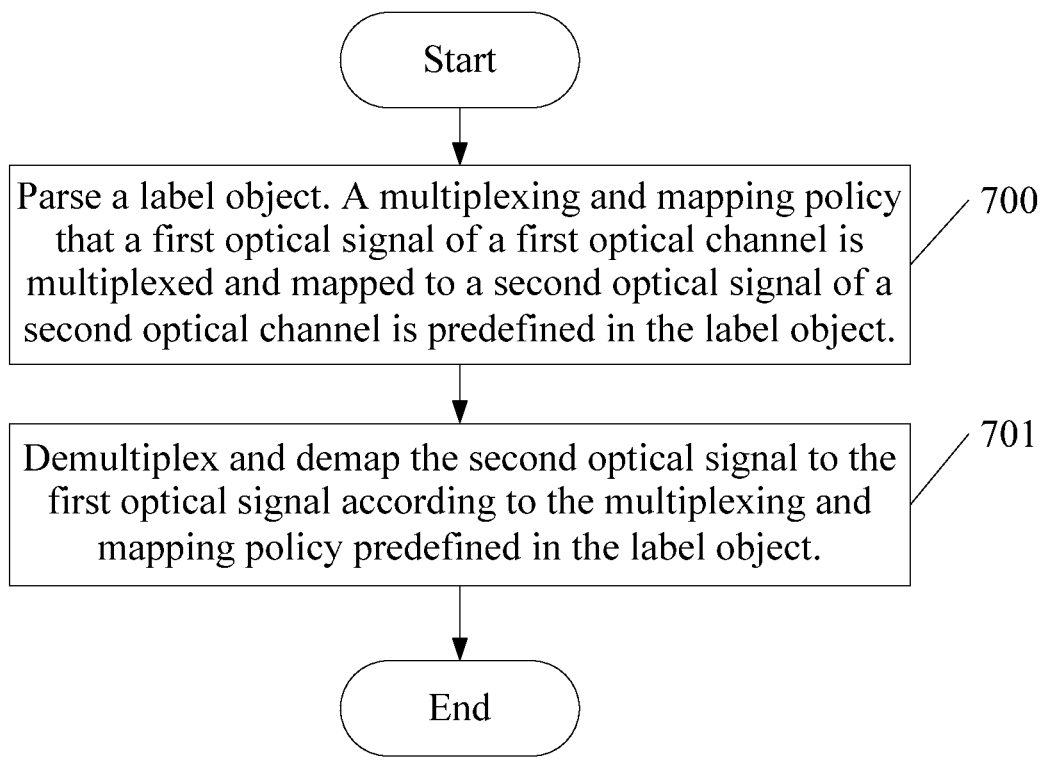
FIG. 7 is a schematic flow chart of a method for demultiplexing and demapping optical signals according to an embodiment of the present invention.

FIG. 7 is a schematic flow chart of a method for demultiplexing and demapping optical signals according to an embodiment of the present invention.

Referring to FIG. 7, the method for demultiplexing and demapping optical signals according to this embodiment includes the following steps:

Step 700: Parse a label object including a label and a label header, to obtain a multiplexing and mapping policy with which a first optical signal on a first optical channel is multiplexed and mapped to a second optical signal on a second optical channel, where the multiplexing and mapping policy is predefined by the label in the label object. The label includes a type indication field and a TS indication field.

The multiplexing and mapping policy includes a matching relation between a type of the first optical signal and a type of the second optical signal, and a TS of the second optical signal occupied by each part of the first optical signal when the first optical signal is multiplexed and mapped to the second optical signal according to the matching relation, where the matching relation is indicated by the type indication field and the TS is indicated by the TS indication field.

Step 701: Demultiplex and demap the second optical signal to the first optical signal according to the multiplexing and mapping policy.

The format of the label object in the embodiment is consistent with that in the embodiment of the method for multiplexing and mapping optical signals, the description of which is omitted here.

The label object can further include a base unit indication field. The demultiplexing and demapping the second optical signal to the first optical signal according to the multiplexing and mapping policy includes demultiplexing and demapping the second optical signal to the first optical signal of the first optical channel according to the type indication field and the TS indication field in the label object with the base unit indicated by the base unit indication field.

Figure 8:
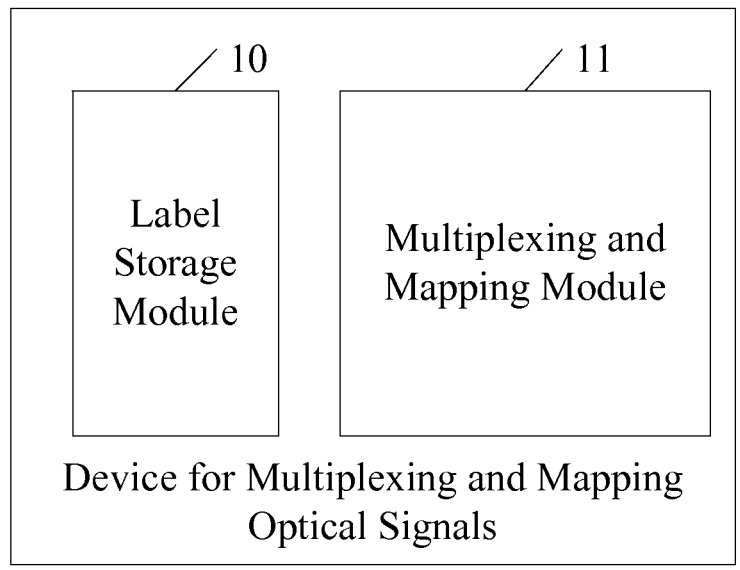
FIG. 8 is a schematic structural view of a device for multiplexing and mapping optical signals according to an embodiment of the present invention.

FIG. 8 is a schematic structural view of a device for multiplexing and mapping optical signals according to an embodiment of the present invention.

Referring to FIG. 8, the device for multiplexing and mapping optical signals according to this embodiment can include a label storage module 10 and a multiplexing and mapping module 11.

The label storage module 10 is configured to store a label object indicating a multiplexing and mapping relation. The label object includes a label and a label header. The label includes a type indication field and a TS indication field.

The label object predefines a multiplexing and mapping policy about a first optical signal on a first optical channel and a second optical signal on a second optical channel. The multiplexing and mapping policy can include a matching relation between a type of the first optical signal and a type of the second optical signal, and a TS of the second optical signal occupied by each part of the first optical signal when the first optical signal is multiplexed and mapped to the second optical signal according to the matching relation, where the matching relation is indicated by the type indication field and the TS is indicated by the TS indication field.

The multiplexing and mapping module 11 is configured to multiplex and map the first optical signal of the first optical channel to the second optical signal of the second optical channel according to the multiplexing and mapping policy.

The label storage module 10 can specifically include a type storage sub-module and a TS storage sub-module.

The type storage sub-module is configured to store the type indication field in the label object in a first bit in the label object.

The TS storage sub-module is configured to store the TS indication field in the label object in a second bit in the label object. The second bit refers to other or all bits except the first bit in the label object.

Alternatively, the label storage module 10 further includes a unit storage sub-module configured to store a base unit indication field in the label object in the label or label header of the label object.

It is noted that, when the label object further includes a base unit indication field of an optical signal, the optical signal further needs to be multiplexed and mapped with the base unit. The multiplexing and mapping policy further includes the base unit of the first optical signal and the second optical signal, where the base unit is indicated by the base unit indication field. That is, when an extension supports an ODU0, ODU4 and so on, the label of the label object includes the base unit indication field. Or, by using a method for assigning one new value to C-TYPE, a base unit is indicated with the label header in the label object (that is, when a value of the C-TYPE is equal to the newly assigned value, it is indicated that the label in the label object is an OTN label, and the base unit is the ODU0). Then at this time, it is needed to parse content of the base unit indication field from the C-TYPE.

The format of the label object in the embodiment is consistent with that in the embodiment of the method for multiplexing and mapping optical signals, the description of which is omitted here.

Figure 9:
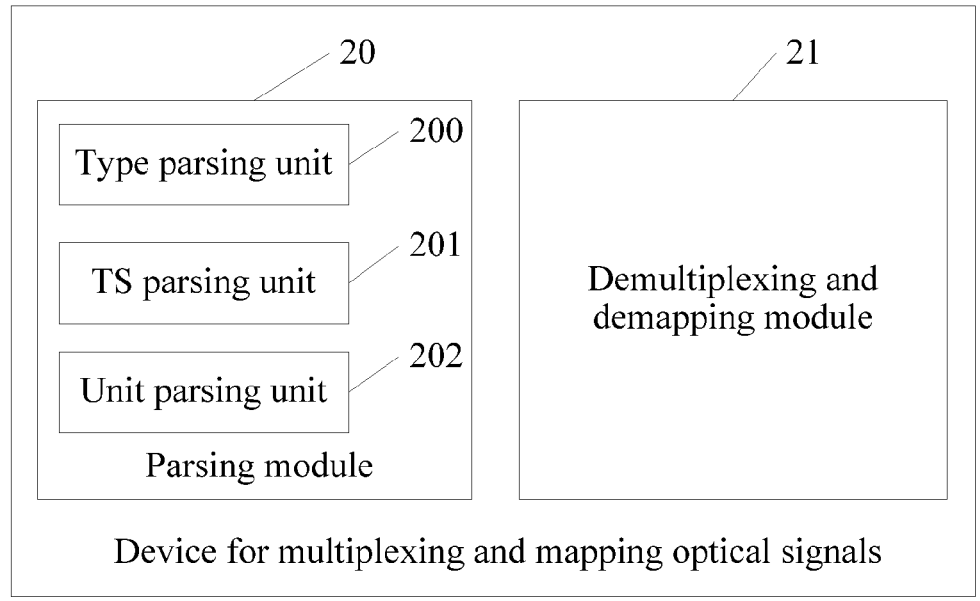
FIG. 9 is a schematic structural view of a device for demultiplexing and demapping optical signals according to an embodiment of the present invention.

FIG. 9 is a schematic structural view of a device for demultiplexing and demapping optical signals according to an embodiment of the present invention.

Referring to FIG. 9, the device for demultiplexing and demapping optical signals according to the embodiment can include a parsing module 20 and a demultiplexing and demapping module 21.

The parsing module 20 is configured to parse a label object including a label and a label header, to obtain a multiplexing and mapping policy with which a first optical signal on a first optical channel is multiplexed and mapped to a second optical signal on a second optical channel, where the multiplexing and mapping policy is predefined by the label in the label object. The label includes a type indication field and a TS indication field.

The multiplexing and mapping policy includes a matching relation between a type of the first optical signal and a type of the second optical signal, and a TS of the second optical signal occupied by each part of the first optical signal when the first optical signal is multiplexed and mapped to the second optical signal according to the matching relation, where the matching relation is indicated by the type indication field and the TS is indicated by the TS indication field.

The demultiplexing and demapping module 21 is configured to demultiplex and demap the second optical signal to the first optical signal according to the multiplexing and mapping policy.

The parsing module 20 specifically can include a type parsing unit 200, a TS parsing unit 201, and a unit parsing unit 202.

The type parsing unit 200 is configured to parse the type indication field in the label object.

The TS parsing unit 201 is configured to parse the TS indication field in the label object.

The unit parsing unit 202 is configured to parse the base unit indication field in the label object. This unit is optional.

Specifically, the type parsing unit 200 parses the type indication field in the label object. The demultiplexing and demapping module 21 demultiplexes a signal of an ODUj to an ODUk (j>k) according to the type indication field in the label object. For example, a value of the type indication field is 04, indicating that an ODU1 (k=1) signal is multiplexed to an ODU2 (j=2). During demultiplexing, according to a case that the value of the type indication field is 04, the ODU2 (j=2) signal is demultiplexed to the ODU1 (k=1).

The TS parsing unit 201 parses the TS indication field in the label object. The demultiplexing and demapping module 21 demultiplexes each TS of the ODUj, and restores them to each part of the ODUk (j>k) according to the TS indication field in the label object. For example, when the ODU1 (k=1) signal is multiplexed to the ODU2 (j=2), the TS indication field is adopted to indicate which one of four TSs in the ODU2 is occupied by the ODU1 specifically. For example, if a solution of an unfixed number is adopted, the value of the TS indication field is 00, indicating that the ODU1 signal occupies a first TS of the ODU2, and the value is 01, indicating that a second TS of the ODU2 is occupied. Thus, when the demultiplexing and demapping module 21 performs demultiplexing, a signal in the first TS of the ODU2 is restored to a signal of the ODU1 if the value according to the TS indication field is, for example, 00, and a signal in the second TS of the ODU2 is restored to a signal of the ODU1 if the value of the TS indication field is 01.

When the label object further includes a base unit indication field of an optical signal, the unit parsing unit 202 further needs to parse a base unit indicated by the base unit indication field. The multiplexing and mapping policy further includes a base unit of the first optical signal and the second optical signal, where the base unit is indicated by the base unit indication field. The demultiplexing and demapping module 21 demultiplexes the optical signal with the base unit.

The format of the label object in the embodiment is consistent with that in the embodiment of the method for multiplexing and mapping optical signals, the description of which is omitted here.

Figure 10:
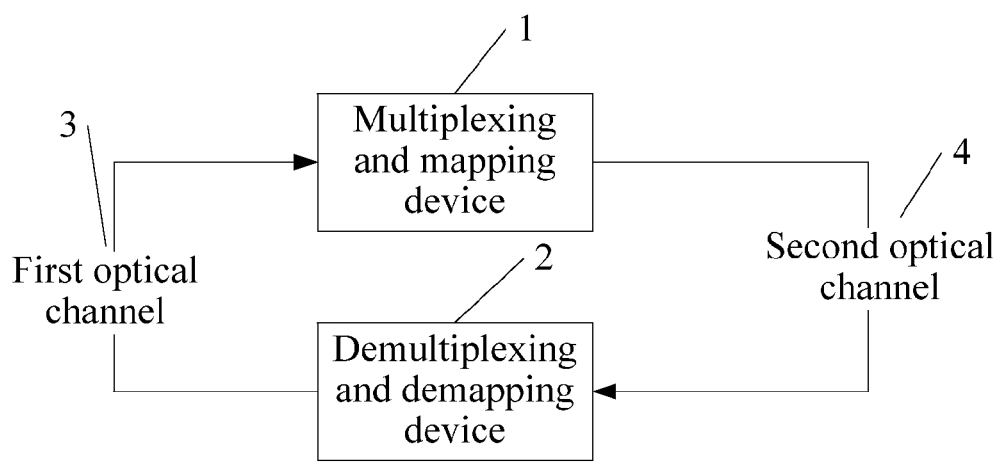
FIG. 10 is a schematic structural view of an optical signal transmission system according to an embodiment of the present invention.

FIG. 10 is a schematic structural view of an optical signal transmission system according to an embodiment of the present invention.

Referring to FIG. 10, the optical signal transmission system according to this embodiment can include a first optical channel 3, a multiplexing and mapping device 1, a second optical channel 4, and a demultiplexing and demapping device 2.

The first optical channel 3 is configured to bear a first optical signal to be multiplexed and mapped.

The multiplexing and mapping device 1 is configured to multiplex and map the first optical signal of the first optical channel 3 to a second optical signal of the second optical channel 4 according to a multiplexing and mapping policy predefined by a label object.

The label object includes a label and a label header. The label includes a type indication field and a TS indication field. The multiplexing and mapping policy includes a matching relation between a type of the first optical signal and a type of the second optical signal, and a TS of the second optical signal occupied by each part of the first optical signal when the first optical signal is multiplexed and mapped to the second optical signal according to the matching relation, where the matching relation is indicated by the type indication field and the TS is indicated by the TS indication field.

The second optical channel 4 is configured to bear the second optical signal.

The demultiplexing and demapping device 2 is configured to demultiplex and demap the second optical signal of the second optical channel 4 to the first optical signal of the first optical channel according to the multiplexing and mapping policy.

It is noted that the first optical channel 3 and the second optical channel 4 mentioned in this embodiment of the present invention refer to channels which bear corresponding optical signals.

During implementation of the optical signal transmission system, optical signals can be multiplexed and demultiplexed according to the label object defined according to the embodiment of the present invention. Because the label object defined according to the embodiment of the present invention indicates the multiplexing and mapping relation and the TS occupied during multiplexing and mapping respectively in the same label, during multiplexing and mapping such as ODU2 to ODU4, the label object has an advantage that signaling overhead is saved.

Figure 11:
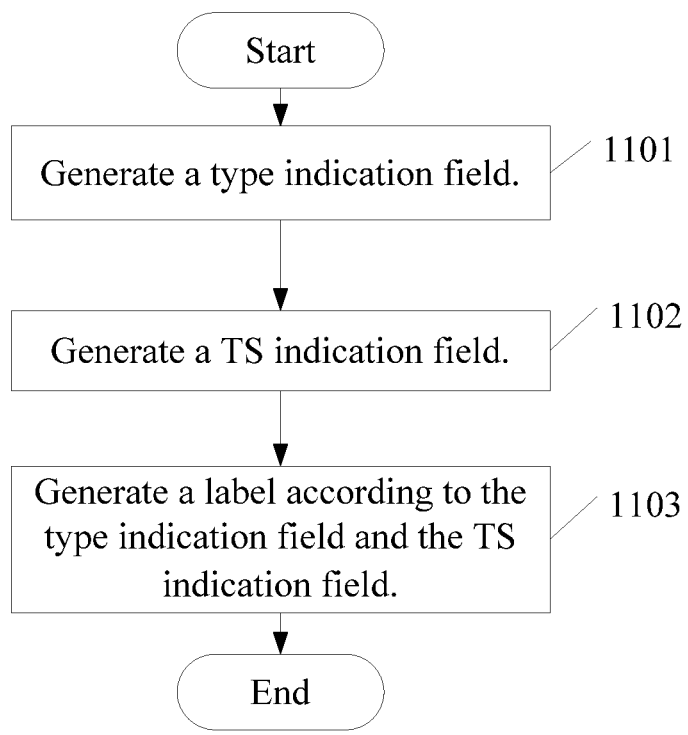
FIG. 11 is a schematic flow chart of a label generation method according to an embodiment of the present invention.

FIG. 11 is a schematic flow chart of a label generation method according to an embodiment of the present invention. As shown in FIG. 11, the method can include the following steps:

Step 1101: Generate a type indication field. The type indication field indicates a matching relation between a type of a first optical signal and a type of a second optical signal.

Step 1102: Generate a TS indication field. The TS indication field indicates a TS of the second optical signal occupied by each part of the first optical signal when the first optical signal is multiplexed and mapped to the second optical signal according to the matching relation.

Step 1103: Generate a label object according to the type indication field and the TS indication field.

Figure 12:
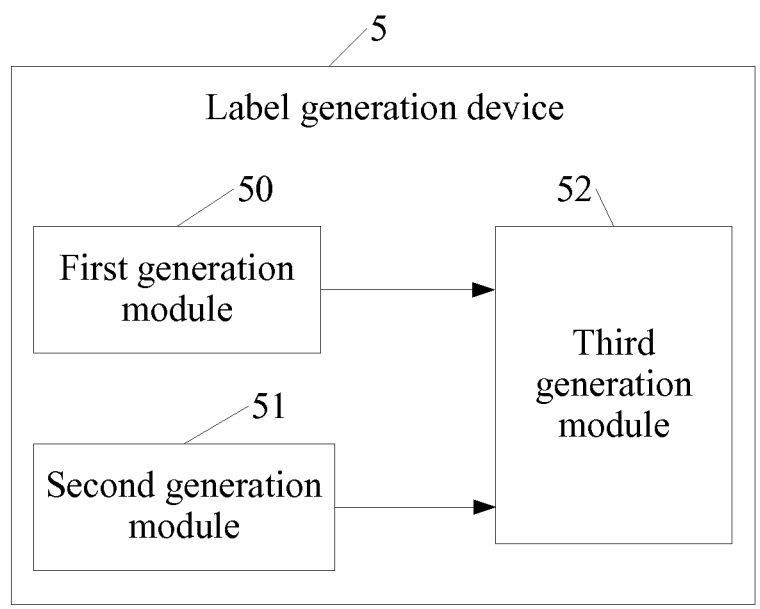
FIG. 12 is a schematic structural view of a label generation device according to an embodiment of the present invention.

FIG. 12 is a schematic structural view of a corresponding label generation device 5 according to an embodiment of the present invention. As shown in FIG. 12, the device can include a first generation module 50, a second generation module 51, and a third generation module 52. The first generation module 50 is configured to generate a type indication field. The type indication field indicates a matching relation between a type of a first optical signal and a type of a second optical signal. The second generation module 51 is configured to generate a TS indication field. The TS indication field indicates a TS of the second optical signal occupied by each part of the first optical signal when the first optical signal is multiplexed and mapped to the second optical signal according to the matching relation. The third generation module 52 is configured to generate a label object according to the type indication field and the TS indication field.

Because the label object defined according to the embodiment of the present invention indicates the multiplexing and mapping relation and the TS occupied during multiplexing and mapping respectively in the same label, during multiplexing and mapping such as ODU2 to ODU4, the label object has an advantage that signaling overhead is saved.

Through the descriptions of the preceding embodiments, those skilled in the art may understand that the present invention may be implemented by using hardware only or by using software and a necessary universal hardware platform. Based on such understandings, all or part of the technical solution under the present invention that makes contributions to the prior art may be essentially embodied in the form of a software product. The software product may be stored in a storage medium, which can be a magnetic disk, a Compact Disk Read-Only Memory (CD-ROM), a Read-Only Memory (ROM) or a Random Access Memory (RAM). The software product includes a number of instructions that enable a computer device (personal computer, server, or network device) to execute the methods provided in the embodiments of the present invention. The foregoing descriptions are merely preferred embodiments of the present invention, but not intended to limit the scope of the present invention. Any modification, equivalent replacement, or improvement made according to the appended claims of the present invention should fall within the scope of the present invention.

The invention claimed is:

1. A method for multiplexing and mapping optical signals, comprising:

acquiring a label object that indicates a multiplexing and mapping relation, wherein the label object comprises a label and a label header, and the label comprises a type indication field and a tributary slot (TS) indication field, wherein the type indication field occupies a first portion of bits in the label, the TS indication field occupies a second portion of bits in the label, and the second portion of bits are part of or all of the bits except the first portion of bits in the label; wherein the label object is used to predefine a multiplexing and mapping policy between a first optical signal on a first optical channel and a second optical signal on a second optical channel, wherein the multiplexing and mapping policy comprises a matching relation between a type of the first optical signal and a type of the second optical signal, and a TS of the second optical signal occupied by each part of the first optical signal when the first optical signal is multiplexed and mapped to the second optical signal according to the matching relation, wherein the matching relation is indicated by the type indication field, and the TS is indicated by the TS indication field; and multiplexing and mapping the first optical signal to the second optical signal according to the multiplexing and mapping policy.

2. The method for multiplexing and mapping optical signals according to claim 1, wherein:
the label object further comprises a base unit indication field, the base unit indication field is located in the label or the label header, and
the multiplexing and mapping policy further comprises a base unit of the first optical signal and the second optical signal, and the base unit is indicated by the base unit indication field.

3. A method for demultiplexing and demapping optical signals, comprising:
parsing a label object comprising a label and a label header, to obtain a multiplexing and mapping policy with which a first optical signal on a first optical channel is multiplexed and mapped to a second optical signal on a second optical channel, wherein the multiplexing and mapping policy is predefined by the label, and the label comprises a type indication field and a tributary slot (TS) indication field, wherein the type indication field occupies a first portion of bits in the label the TS indication field occupies a second portion of bits in the label, and the second portion of bits are part of or all of the bits except the first portion of bits in the label; and
demultiplexing and demapping the second optical signal to the first optical signal according to the multiplexing and mapping policy; wherein
the multiplexing and mapping policy comprises a matching relation between a type of the first optical signal and a type of the second optical signal, and a TS of the second optical signal occupied by each part of the first optical signal when the first optical signal is multiplexed and mapped to the second optical signal according to the matching relation, the matching relation is indicated by the type indication field, and the TS is indicated by the TS indication field.

4. The method for demultiplexing and demapping optical signals according to claim 3, wherein the parsing the label object comprises:
parsing the type indication field in the label object; and
parsing the TS indication field in the label object; and
the demultiplexing and demapping the second optical signal to the first optical signal according to the multiplexing and mapping policy comprises:
demultiplexing and demapping the second optical signal to the first optical signal of the first optical channel according to the type indication field and the TS indication field in the label object.

5. The method for demultiplexing and demapping optical signals according to claim 3, wherein the label object further comprises a base unit indication field, the multiplexing and mapping policy further comprises a base unit of the first optical signal and the second optical signal, the base unit is indicated by the base unit indication field,
the parsing the label object comprises:
parsing the type indication field in the label object,
parsing the TS indication field in the label object, and
parsing the base unit indication field in the label object, and
the demultiplexing and demapping the second optical signal to the first optical signal according to the multiplexing and mapping policy comprises:
demultiplexing and demapping the second optical signal to the first optical signal of the first optical channel according to the type indication field and the TS indication field in the label object with the base unit indicated by the base unit indication field.

6. A device for multiplexing and mapping optical signals, comprising:
a label storage module, configured to store a label object indicating a multiplexing and mapping relation, wherein the label object comprises a label and a label header, the label comprises a type indication field and a tributary slot (TS) indication field, wherein the type indication field occupies a first portion of bits in the label the TS indication field occupies a second portion of bits in the label, and the second portion of bits are part of or all of the bits except the first portion of bits in the label, the label object predefines a multiplexing and mapping policy about a first optical signal on a first optical channel and a second optical signal on a second optical channel, the multiplexing and mapping policy comprises a matching relation between a type of the first optical signal and a type of the second optical signal and a TS of the second optical signal occupied by each part of the first optical signal when the first optical signal is multiplexed and mapped to the second optical signal according to the matching relation, the matching relation is indicated by the type indication field, and the TS is indicated by the TS indication field; and
a multiplexing and mapping module, configured to multiplex and map the first optical signal of the first optical channel to the second optical signal of the second optical channel according to the multiplexing and mapping policy.

7. The device for multiplexing and mapping optical signals according to claim 6, wherein the label storage module further comprises:
a unit storage sub-module, configured to store a base unit indication field in the label object in the label or the label header of the label object, wherein the multiplexing and mapping policy further comprises base unit of the first optical signal and the second optical signal, and the base unit is indicated by the base unit indication field.

8. A device for demultiplexing and demapping optical signals, comprising:
a parsing module, configured to parse a label object comprising a label and a label header, to obtain a multiplexing and mapping policy with which a first optical signal on a first optical channel is multiplexed and mapped to a second optical signal on a second optical channel, wherein the multiplexing and mapping policy is predefined by the label, and the label comprises a type indication field and a tributary slot (TS) indication field, wherein the type indication field occupies a first portion of bits in the label the TS indication field occupies a second portion of bits in the label, and the second portion of bits are part of or all of the bits except the first portion of bits in the label; and
a demultiplexing and demapping module, configured to demultiplex and demap the second optical signal to the first optical signal according to the multiplexing and mapping policy; wherein
the multiplexing and mapping policy comprises a matching relation between a type of the first optical signal and a type of the second optical signal and a TS of the second optical signal occupied by each part of the first optical signal when the first optical signal is multiplexed and mapped to the second optical signal according to the matching relation, the matching relation is indicated by the type indication field, and the TS is indicated by the TS indication field.

9. The device for demultiplexing and demapping optical signals according to claim 8, wherein the parsing module comprises:
   a type parsing unit, configured to parse the type indication field in the label object; and
   a TS parsing unit, configured to parse the TS indication field in the label object.

10. The device for demultiplexing and demapping optical signals according to claim 8, wherein the label object further comprises a base unit indication field located in the label or the label header, the multiplexing and mapping policy further comprises a base unit of the first optical signal and the second optical signal, the base unit is indicated by the base unit indication field, and the parsing module comprises:
   a type parsing unit, configured to parse the type indication field in the label object;
   a TS parsing unit, configured to parse the TS indication field in the label object; and
   a unit parsing unit, configured to parse the base unit indication field in the label object.

* * * * *